United States Patent [19]

Hayes

[11] Patent Number: 5,628,427
[45] Date of Patent: May 13, 1997

[54] DISPOSABLE COOKING PAN

[75] Inventor: Thomas J. Hayes, Wauconda, Ill.

[73] Assignee: Packaging Corporation of America, Evanston, Ill.

[21] Appl. No.: 472,491

[22] Filed: Jun. 7, 1995

[51] Int. Cl.[6] .................................................. B65D 90/00
[52] U.S. Cl. ................................... 220/669; 229/3.5 MF
[58] Field of Search ..................................... 220/608, 574, 220/604, 669, 675, 912; 229/3.5 MF, 406

[56]  References Cited

U.S. PATENT DOCUMENTS

| | | |
|---|---|---|
| D. 287,809 | 1/1987 | Alexander . |
| D. 288,055 | 2/1987 | Alexander . |
| 3,659,585 | 5/1972 | Bay ............................................. 220/675 |
| 4,167,233 | 9/1979 | Hare . |
| 4,616,762 | 10/1986 | Alexander . |
| 4,883,195 | 11/1989 | Ott et al. ................................. 229/406 X |
| 4,971,216 | 11/1990 | Fortune . |
| 5,029,721 | 7/1991 | Timpe . |

OTHER PUBLICATIONS

"Premium Foil Products—Foil Container Specifications", date unknown.
"Alcan Foil Products", Alcan Foil Products, Division of Alcan Aluminum Limited, pp. 1–40, 1992.
"Alcan Foil Products—1989 Foil Container Specifications Catalogue", Alcan Foil Products, Division of Alcan Aluminum Corporation, pp. 1–17, printed Apr. 1989.
"Aluminum Foil Formed Products", Penny Plate®, Inc., pp. 1–19, date unknown.
"Stock Containers", Penny Plate®, Inc., pp. 1–16, 1979.
"1988 Food Service Packaging Aluminum and Plastics Specifications Catalog", Wilkinson, pp. 1–42, 1988.
"Chicago Metallic Food Service Foil Containers", Chicago Metallic, 4 pages, date unknown.
Chicago Metallic catalog, Chicago Metallic, Division of C.M. Products, 28 pages, Jul. 1990.
"Bulkware Specifications Catalog", HFA Inc., pp. 1–8, date unknown.
"Reynolds Aluminum Containers, Trays & Lids", Reynolds Metals Company, pp. 1–33, 1988.
"Kaiser Packaging—Distributor Prices", Kaiser Packaging, pp. 1–28, 1986.
"Catalog of Foodservice Products", Kaiser Packaging, pp. 1–39, 1986.
"Aluminum Foil Containers and Polystyrene Dome Covers", Revere Foil Containers, pp. 1–16, date uknown.
"Price Catalog No. 665", Impax, pp. 1–20, Jun. 1, 1965.
E–Z Foil catalog, EZ Por® Corporation, pp. 1–42, date unknown.
Alupla brochure, Cebal–Alupla, 4 pages, approx. 1975.
"Glaco Packaging Products", Glaco Packaging Products, pp. 1–10, date unknown.

(List continued on next page.)

Primary Examiner—Steven M. Pollard
Attorney, Agent, or Firm—Arnold, White & Durkee

[57]    ABSTRACT

A disposable cooking pan formed from a single sheet of metal comprises a bottom panel, a continuous wall panel, and a continuous rim. The continuous wall panel encompasses the bottom panel and extends upwardly and outwardly from the bottom panel. The continuous wall panel forms a first pair of opposing side walls, a second pair of opposing side walls, and four corners bridging the first and second pairs of side walls. The continuous rim encompasses an upper edge of the continuous wall panel and projects laterally outwardly therefrom. The first pair of side walls define sections of curved surfaces of respective first imaginary cones having respective first imaginary points located below a level of the bottom panel. The second pair of side walls define sections of curved surfaces of respective second imaginary cones having respective second imaginary points located below the level of the bottom panel. The four corners define sections of curved surfaces of respective imaginary cylinders.

21 Claims, 5 Drawing Sheets

OTHER PUBLICATIONS

"Carry Out Containers, Steam Tables & Roasters", Kari–Out Company, 1 page, date unknown.

"Taste More Profits in Tart and Pie Plates", Kaiser Aluminum, 6 pages, approx. 1985.

"Kaiser Aluminum Puts More Profit in Your Cake Sales", Kaiser Aluminum, 6 pages, 1985.

"Bigger Baking Profits Begin With Aluminum Pans", Kaiser Aluminum, 6 pages, 1985.

Anaconda catalog, Anaconda Aluminum Company, 10 pages, 1981.

DISPOSABLE COOKING PAN

FIELD OF THE INVENTION

The present invention relates generally to disposable cooking pans and, more particularly, relates to a disposable cooking pan designed to provide superior structural strength.

BACKGROUND OF THE INVENTION

Various disposable and inexpensive cooking utensils, such as pans for use in heating and/or cooking food products, such as hams, roasts, turkeys, etc., have become popular because they are relatively inexpensive and eliminate the need for pan cleaning after the heating and/or cooking of the food product has occurred. Such pans are normally formed of a light or thin gauge material such as aluminum foil. Cooking pans made from aluminum foil have the heat transference qualities associated with the metal aluminum and, yet, because of the minimal amount of metal utilized in the structure, are inexpensive and, consequently, can be disposed of after a single use.

The convenience of having an inexpensive disposable pan by utilizing thin gauge metal, e.g., aluminum foil, is achieved with the attendant factor that the pan has diminished structural strength. One measure of the structural strength of the pan is known as the "pickup" strength. The "pickup" strength may be defined as the maximum weight which can be lifted by the pan prior to complete buckling and collapse of the pan. Thus, thin gauge foil pans are inherently weak and are incapable of carrying heavy loads. Obviously, if the gauge of the metal is increased to increase the structural integrity of the pan, the pan cost will also increase.

To achieve added structural strength without increasing the metal gauge or thickness, it is customary to form ribs of varying sizes and designs in the bottom and side wall of a pan. Also, controlled wrinkles or folds are often incorporated in the side wall, and the lip of the pan is curled or beaded in a variety of ways to increase the overall structural strength of the pan. All of these strength-enhancing features have been generally successful in producing inexpensive disposable foil pans for home cooking. However, additional strengthening means are still desirable in the larger pans such as those used for cooking heavy loads such as roasts, hams, and turkeys.

SUMMARY OF THE INVENTION

In one particular embodiment of the present invention, a disposable cooking pan formed from a single sheet of metal comprises a bottom panel, a continuous wall panel, and a continuous rim. The continuous wall panel encompasses the bottom panel and extends upwardly and outwardly from the bottom panel. The continuous wall panel forms a first pair of opposing side walls, a second pair of opposing side walls, and four corners bridging the first and second pairs of side walls. The continuous rim encompasses an upper edge of the continuous wall panel and projects laterally outwardly therefrom. The first pair of side walls define sections of curved surfaces of respective first imaginary cones having respective first imaginary points located below a level of the bottom panel. The second pair of side walls define sections of curved surfaces of respective second imaginary cones having respective second imaginary points located below the level of the bottom panel. The four corners define sections of curved surfaces of respective imaginary cylinders.

DESCRIPTION OF THE DRAWINGS

Other objects and advantages of the invention will become apparent upon reading the following detailed description and upon reference to the drawings in which.

Figure 1:
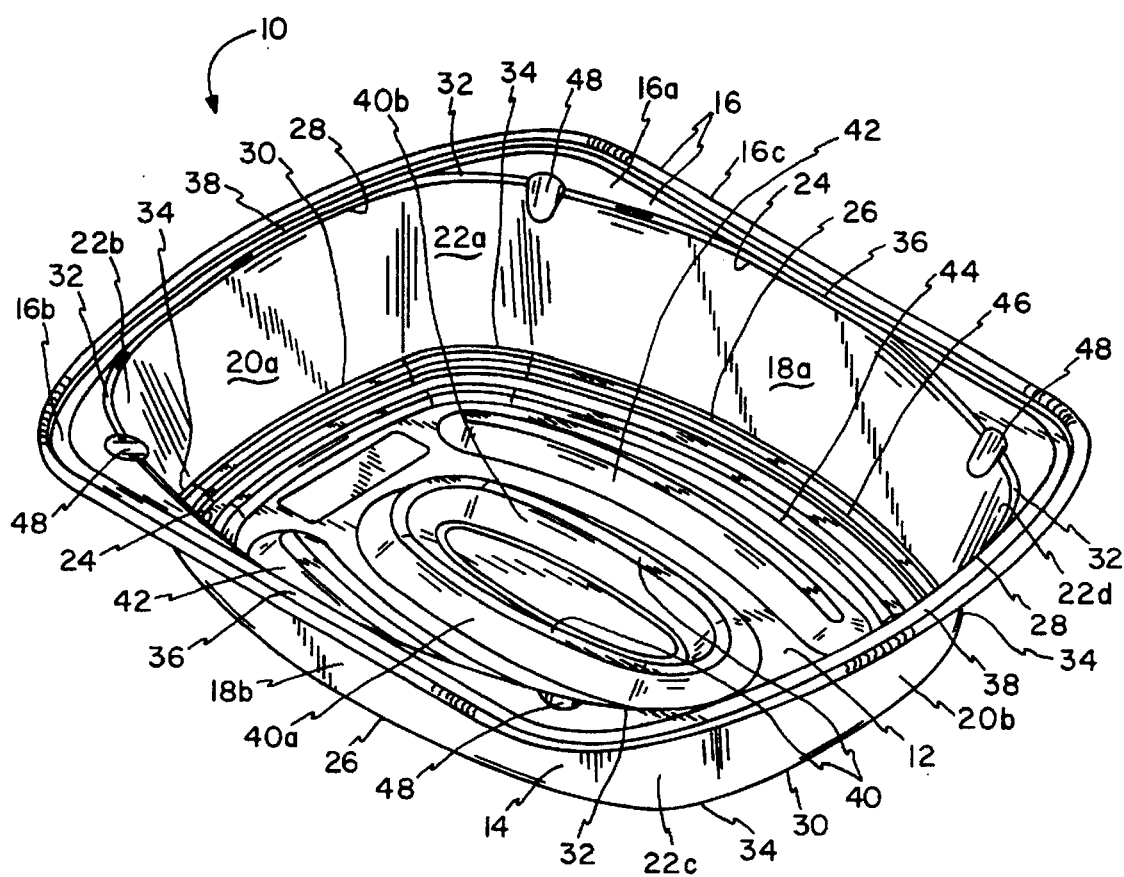
FIG. 1 is an isometric view of a disposable cooking pan embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, FIGS. 1–7 illustrate a disposable cooking pan 10 formed from a single sheet of thin gauge metal such as aluminum foil. If the selected metal is aluminum foil, the gauge or thickness is preferably in the range from approximately 0.0055 inches to approximately 0.008 inches. The cooking pan 10 includes a bottom panel 12, a continuous wall panel 14, and a continuous rim 16. The continuous wall panel 14 encompasses the bottom panel 12 and extends upwardly and outwardly from the bottom panel 12. The continuous rim 16 encompasses an upper edge of the continuous wall panel 14 and projects laterally outwardly therefrom.

Figure 2:
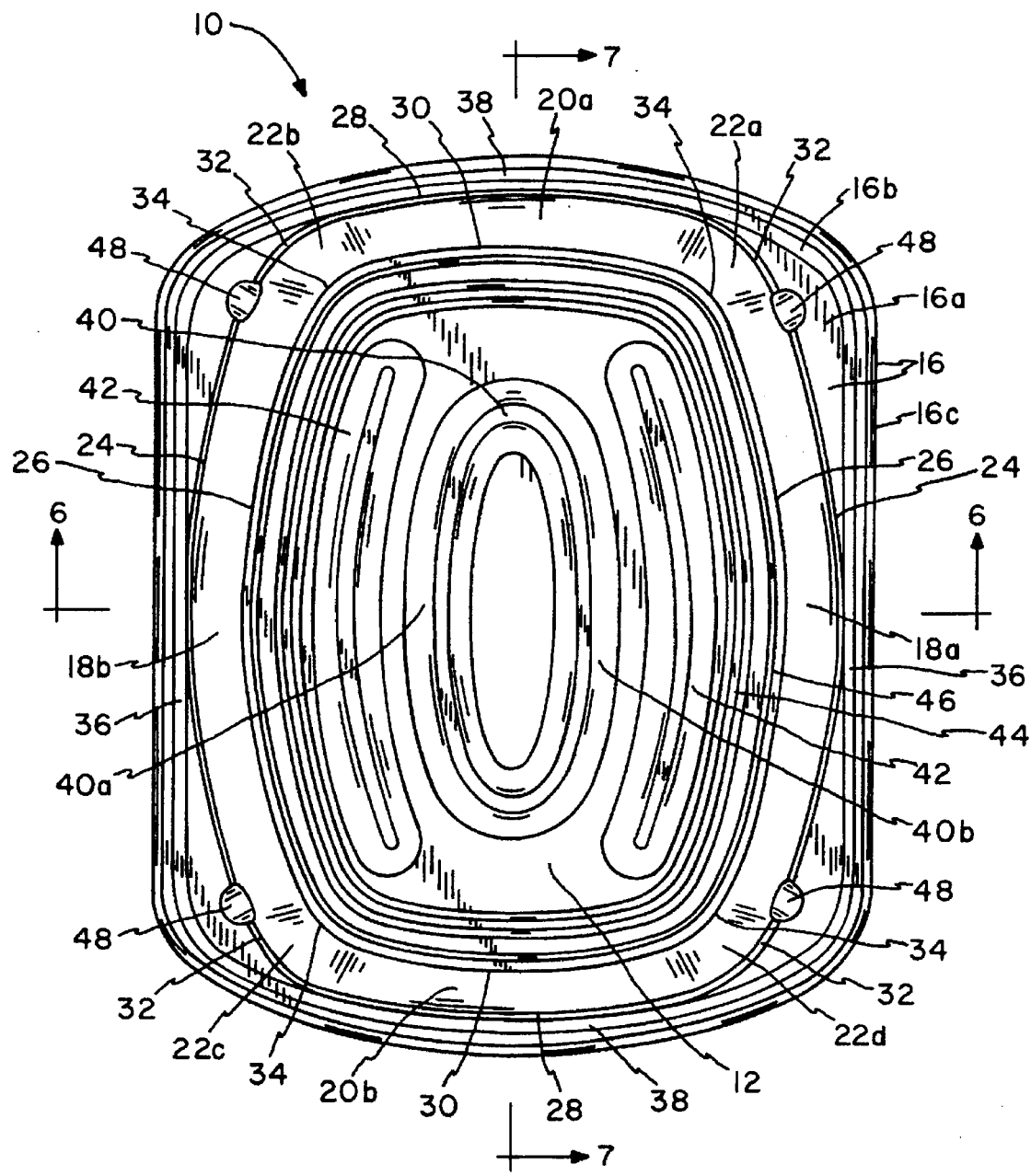
FIG. 2 is a top view of the disposable cooking pan in FIG. 1.
Figure 3:
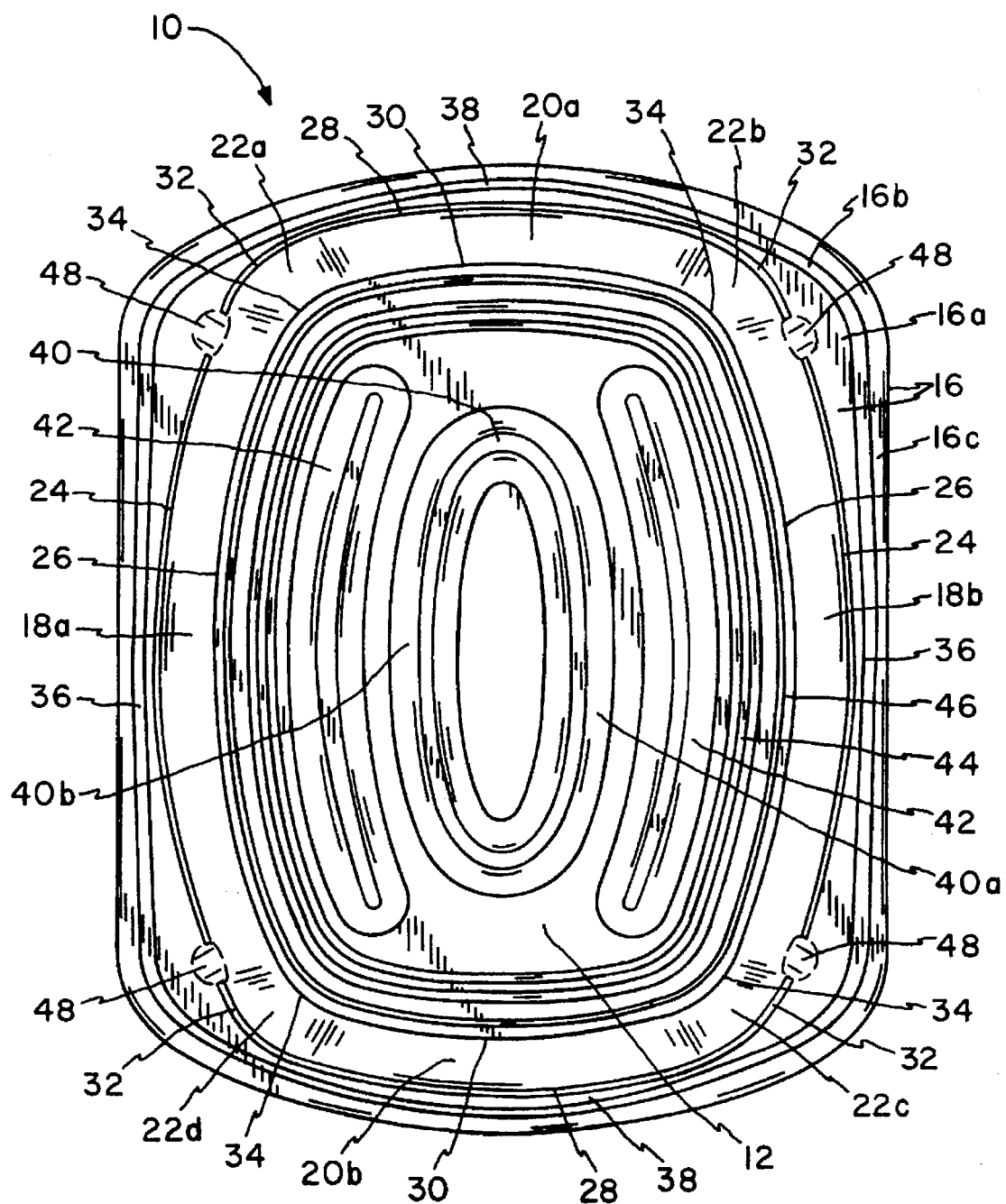
FIG. 3 is a bottom view of the disposable cooking pan in FIG. 1.
Figure 4:
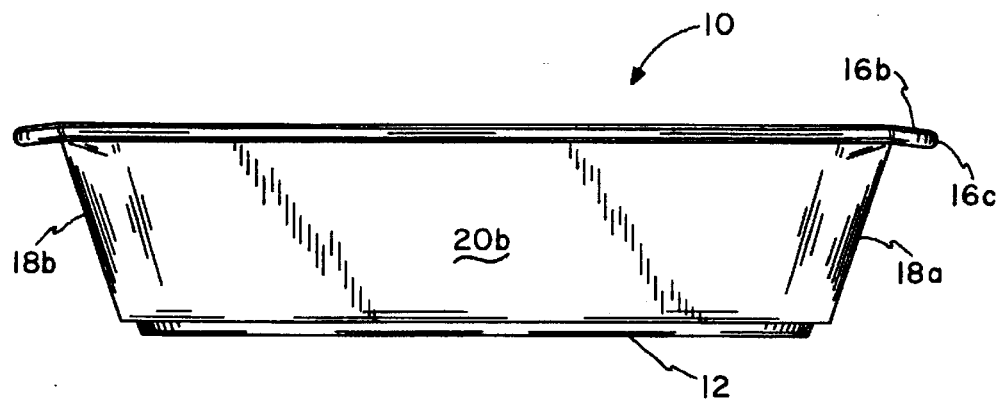
FIG. 4 is an end view of the disposable cooking pan in FIG. 1.
Figure 5:
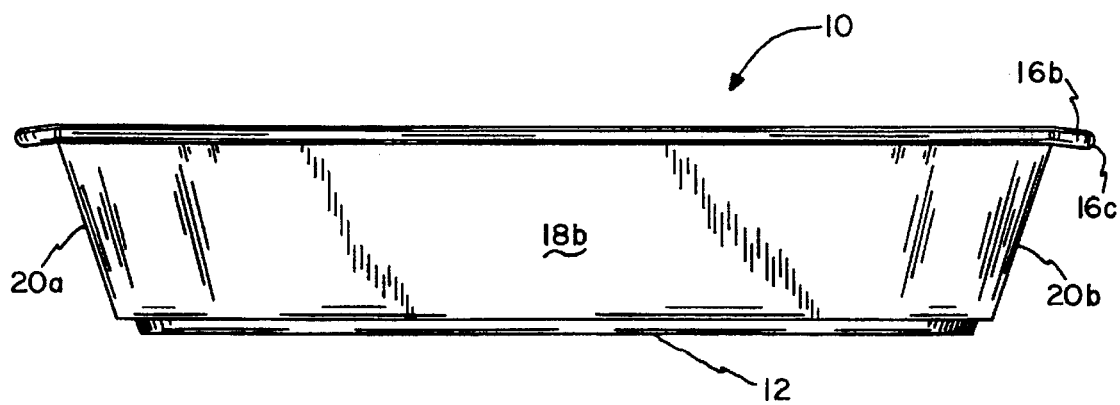
FIG. 5 is a side view of the disposable cooking pan in FIG. 1.

The continuous wall panel 14 forms a first pair of opposing side walls 18a and 18b, a second pair of opposing side walls 20a and 20b, and four corners 22a, 22b, 22c, and 22d bridging the first and second pairs of side walls. Each of the first pair of side walls 18a and 18b includes curvilinear upper and lower edges 24 and 26 having respective radii of curvature (FIGS. 1–3). Similarly, each of the second pair of side walls 20a and 20b include curvilinear upper and lower edges 28 and 30 having respective radii of curvature (FIGS. 1–3). Each of the four corners 22a, 22b, 22c, and 22d includes curvilinear upper and lower corner edges 32 and 34 having respective radii of curvature (FIGS. 1–3).

The disposable cooking pan 10 includes various features which enhance the structural rigidity of the pan 10. First, the continuous wall panel 14 is specially configured, and the radii of curvature of the various edges of the side walls and corners are specially selected, to strengthen the cooking pan 10. In one embodiment, the first pair of side walls 18a and 18b define or encompass sections of curved surfaces of respective identical first imaginary cones having respective first imaginary points located below a level of the bottom panel 12 (FIG. 1). The side wall 18a forms part of one of the first imaginary cones, while the side wall 18b forms part of the other of the first imaginary cones. Such first imaginary cones dictate that the radius of curvature of the lower edges 26 be less than the radius of curvature of the upper edges 24. In one particular embodiment, the radius of curvature of the lower edges 26 is approximately 14.3 inches and the radius of curvature of the upper edges 24 is approximately 15.3 inches.

Similarly, the second pair of side walls 20a and 20b define or encompass sections of curved surfaces of respective identical second imaginary cones having respective second imaginary points located below the level of the bottom panel 12 (FIG. 1). The side wall 20a forms part of one of the second imaginary cones, while the side wall 20b forms part of the other of the second imaginary cones. Such second imaginary cones dictate that the radius of curvature of the lower edges 30 be less than the radius of curvature of the upper edges 28. In one particular embodiment, the radius of curvature of the lower edges 30 is approximately 11.9 inches and the radius of curvature of the upper edges 28 is approximately 12.9 inches.

To form transitions between the cone sections formed by the side walls, the four corners 22a, 22b, 22c, and 22d define or encompass sections of curved surfaces of respective identical imaginary cylinders such that the radius of curvature of the upper corner edges 32 is substantially equal to the radius of curvature of the lower corner edges 34 (FIG. 1). In one particular embodiment, the radii of curvature of the upper and lower corner edges 32 and 34 are each approximately 2.60 inches. The cylinder sections formed by the corners interconnect the cone sections formed by the side walls. This cone-cylinder-cone geometric arrangement improves the structural rigidity of the disposable cooking pan 10.

In an alternative embodiment, the pan 10 is modified so that the corners are configured as sections of respective identical imaginary cones while the side walls are configured as sections of respective imaginary cylinders. The cone sections formed by the corners interconnect the cylinder sections formed by the side walls.

Referring back to the embodiment depicted in FIGS. 1–7, the cone sections formed by the side walls and the cylinder sections formed by the corners are preferably configured such that the radius of curvature of the lower edges 26 is between about five and six times larger than the radius of curvature of the lower corner edges 34. The radius of curvature of the lower edges 26 is slightly larger than the radius of curvature of the lower edges 30, which, in turn, is between about four and five times larger than the radius of curvature of the lower corner edges 34. Likewise, the radius of curvature of the upper edges 24 of the side walls 18a and 18b and the radius of curvature of the upper edges 28 of the side walls 20a and 20b are each substantially larger than the radius of curvature of the upper corner edges 32. In one embodiment, the radius of curvature of the upper edges 24 is between about five and six times larger than the radius of curvature of the upper corner edges 32. The radius of curvature of the upper edges 24 is slightly larger than the radius of curvature of the upper edges 28, which, in turn, is between about four and five times larger than the radius of curvature of the upper corner edges 32.

The above-described configuration of the continuous wall panel 14 augments the pickup strength of the cooking pan 10. Furthermore, by resisting inward denting, the configuration of the continuous wall panel 14 maintains the shape of the cooking pan 10 while it is in transit, for example, from a manufacturing facility to a grocery store.

A second important strength-enhancing feature of the cooking pan 10 is the configuration of the continuous rim 16. The continuous rim 16 forms a first pair of rim portions 36 integrally formed with the upper edges 24 of respective ones of the first pair of side walls 18a and 18b (FIGS. 1–3). Likewise, the continuous rim 16 forms a second pair of rim portions 38 integrally formed with the upper edges 28 of respective ones of the second par of side walls 20a and 20b (FIGS. 1–3). The first pair of rim portions 36 have respective inner edges curved on the curvilinear upper edges 24 and have straight outer edges. As best shown in FIGS. 2 and 3, the shape of each of the first pair of rim portions 36 may be described as concavo-straight where the inner edge is concave and the outer edge is straight. The second pair of rim portions 38 have inner edges curved on the curvilinear upper edges 28 and have curvilinear outer edges generally concentric with the curved inner edges of the rim portions 38 so that the inner and outer edges of the rim portions are generally parallel in nature. The curvature on the outwardly-curved outer edge is substantially equal to the curvature on the outwardly-curved inner edge.

The continuous rim 16 includes a substantially horizontal inner planar flange or section 16a, a declining middle planar flange or section 16b, and an outer reinforcing bead 16c (FIGS. 1–3). The inner section 16a projects laterally outwardly from the upper edge of the continuous wall panel 14. As best shown in FIGS. 2 and 3, the inner section 16a is intermittently located, not continuously located, along the rim 16. More specifically, the inner section 16a is located in four separate regions of the rim 16. A first of these four regions projects laterally outwardly from both the upper edge 32 of the corner 22a and an adjacent section of the upper edge 24 of the side wall 18a; a second of these regions projects laterally outwardly from both the upper edge 32 of the corner 22b and an adjacent section of the upper edge 24 of the side wall 18b; a third of these regions projects laterally outwardly from both the upper edge 32 of the corner 22c and an adjacent section of the upper edge 24 of the side wall 18b; and a fourth of these regions projects laterally outwardly from both the upper edge 32 of the corner 22d and an adjacent section of the upper edge 24 of the side wall 18a. The inner section 16a does not project laterally outwardly from the upper edges 28 of the side walls 20a and 20b or from central sections of the upper edges 24 of the side walls 18a and 18b.

The middle planar section 16b of the continuous rim 16 is continuously located along the rim 16. The continuous middle section 16b encompasses the inner section 16a and is declined at an angle of approximately 15° relative to the horizontal inner section 16a. The width of the continuous middle section 16b is constant along the rim 16. The declining middle section 16b of the rim 16 allows the cooking pan 10 to resist bending when it is lifted by the rim 16, thereby improving the pickup strength of the cooking pan 10.

The reinforcing bead 16c may be in the form of a tight coil which is continuous and encompasses the middle planar section 16b of the rim 16. The bead 16c is integrally formed with the middle planar section 16b. As is well known in the art, curling or beading the rim 16 to create the bead 16c increases the overall structural rigidity of the pan 10.

Another important feature adding to the structural rigidity, and therefore the pickup strength, of the cooking pan 10 is the rib configuration formed by the bottom panel 12. As best shown in FIGS. 1–3, the bottom panel 12 forms a centrally-located narrow oval rib 40 and a pair of narrow curved ribs 42 extending upwardly from a lowermost planar surface of the bottom panel 12. The curved ribs 42 are located on opposite sides of the oval rib 40. The major (longer) axis of the oval rib 40 passes through the center of the bottom panel 12 and is located halfway between the side walls 18a and 18b. The minor (shorter) axis of the oval rib 40 passes through the center of the bottom panel 12 and is located halfway between the side walls 20a and 20b.

The oval rib 40 includes opposing curved sections 40a and 40b defining respective curves generally parallel to the lower edges 26 of respective ones of the first pair of side walls 18a and 18b. The major axis of the oval rib 40 is located halfway between the opposing curved sections 40a and 40b. Similarly, the curved ribs 42 define respective curves generally parallel to respective ones of the curved sections 40a and 40b of the oval rib 40 and generally parallel to the lower edges 26 of respective ones of the first pair of side walls 18a and 18b. One of the curved ribs 42 is located in close proximity to the curved section 40a of the oval rib 40, while the other of the curved ribs 42 is located in close proximity to the curved section 40b of the oval rib 40.

Figure 6:
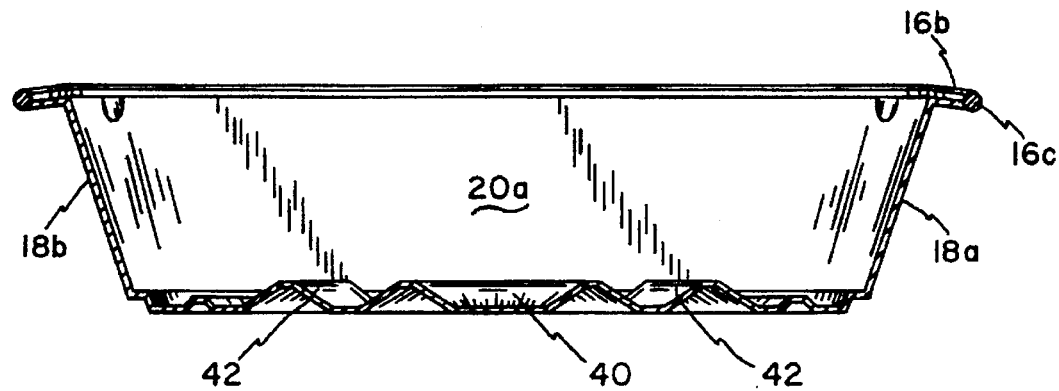
FIG. 6 is a section taken generally along the line 6—6 in FIG. 2.
Figure 7:
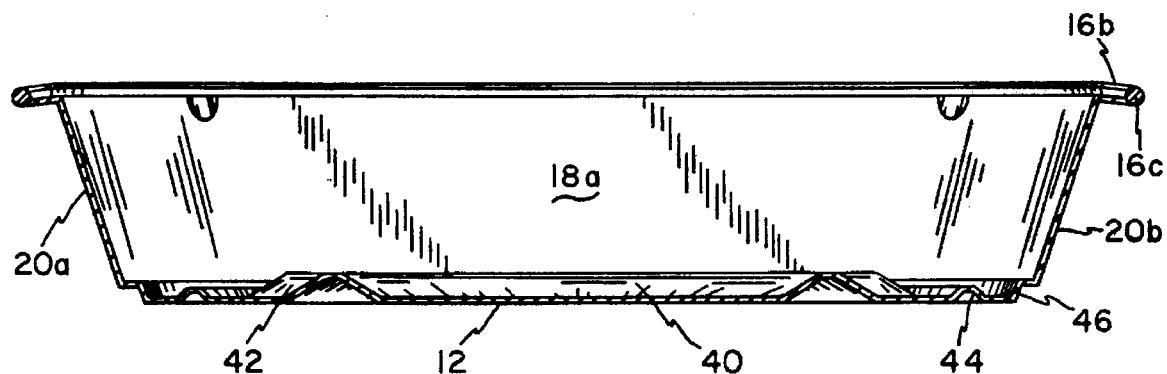
FIG. 7 is a section taken generally along the line 7—7 in FIG. 2.

The oval rib 40 and the curved ribs 42 prevent the cooking pan 10 and its bottom panel 12 from flexing downward when the pan 10 is carried with a food product therein. As a result, the oval rib 40 and the curved ribs 42 provide the cooking pan 10 with increased pickup strength. In addition to adding structural rigidity to the cooking pan 10, the oval rib 40 and the curved ribs 42 serve to lift a food product (e.g., ham, roast, turkey, etc.) in the pan 10 out of its own juices. By lifting the food product out of its own juices, the oval rib 40 and the curved ribs 42 promote uniform cooking of the food product and prevent the food product from absorbing excessive fat. The oval rib 40 and the curved ribs 42 are sufficiently narrow in width and are comprised of one or more cross-sectional shapes that they will resist denting and bending under the weight of such a heavy food product as a ham, roast, or turkey. As best shown in FIGS. 6–7, the top ends of the oval rib 40 and the curved ribs 42 are generally spherical or curved, as opposed to being flat.

A fourth strength-enhancing feature of the cooking pan 10 is the configuration of the periphery of the bottom panel 12. The periphery of the bottom panel 12 includes an embossed (raised) rib 44 and a peripheral step 46. The peripheral step 46 encompasses the embossed rib 44 and forms a step-up transition from the bottom panel 12 to the lower edge of the continuous wall panel 14.

A further strength-enhancing feature of the cooking pan 10 is the formation of generally concave gussets or ribs 48 in the inner rim sections 16a and in the side walls 18a and 18b near the corners 22a, 22b, 22c, and 22d (FIGS. 1–3). One or more gussets 48 may be located near each corner. Each gusset 48 is angularly disposed relative to the plane of the associated inner rim section 16a and relative to the adjacent portion of the associated side wall. If desired, the gussets 48 may be designed as described and illustrated in U.S. Pat. No. 4,616,762 to Alexander, which is incorporated herein by reference. The gussets 48 impart strength to the rim 16 in the regions occupied thereby to resist both vertical and horizontal forces impacting at or near the corners of the cooking pan 10.

Using the strength-enhancing features described herein, the cooling pan 10 exhibits superior structural rigidity relative to prior art cooking pans while using approximately the same gauge and amount of metal. Cooking pans embodying the present invention have performed extremely well when subjected to commonly-practiced pickup tests. In this pickup test, a cooking pan is clamped on a test fixture, and lead shot is poured into the cooking pan via three funnels secured three and one-half inches o above the rim of the pan. The pickup strength of the pan is the maximum weight of lead shots which can be lifted by the pan prior to complete buckling and collapse of the pan. Cooking pans embodying the present invention and composed of aluminum foil having a nominal gauge of approximately 0.006 inches have demonstrated pickup strengths ranging between about 25 and 36 pounds.

While the present invention has been described with reference to one or more particular embodiments, those skilled in the art will recognize that many changes may be made thereto without departing from the spirit and scope of the present invention. For example, a skeletal handle assembly may be fixedly secured to the disposable s cooking pan 10 in order to further reinforce the pan 10. One such handle assembly is described and illustrated in U.S. Pat. No. 5,029,721 to Timpe, which is incorporated herein by reference. Each of these embodiments and obvious variations thereof is contemplated as falling within the spirit and scope of the claimed invention, which is set forth in the following claims.

What is claimed is:

1. A disposable cooking pan formed from a single sheet of metal, comprising:
    a bottom panel;
    a continuous wall panel encompassing said bottom panel and extending upwardly and outwardly from said bottom panel, said continuous wall panel forming a first pair of opposing side walls, a second pair of opposing side walls, and four corners bridging said first and second pairs of side walls, each of said first pair of side walls including curvilinear upper and lower first edges having respective radii of curvature, each of said second pair of side walls including curvilinear upper and lower second edges having respective radii of curvature, each of said four corners including curvilinear upper and lower corner edges having respective radii of curvature, said four corners defining sections of curved surfaces of respective imaginary cylinders such that the radius of curvature of said upper corner edges is substantially equal to the radius of curvature of said lower corner edges; and
    a continuous rim encompassing an upper edge of said continuous wall panel and projecting laterally outwardly therefrom.

2. The disposable cooking pan of claim 1, wherein the radius of curvature of said lower first edges and the radius of curvature of said lower second edges are each substantially larger than the radius of curvature of said lower corner edges, and wherein the radius of curvature of said upper first edges and the radius of curvature of said upper second edges are each substantially larger than the radius of curvature of said upper corner edges.

3. The disposable cooking pan of claim 2, wherein the radius of curvature of said lower first edges and the radius of curvature of said lower second edges are each between about four and six times larger than the radius of curvature of said lower corner edges, and wherein the radius of curvature of said upper first edges and the radius of curvature of said upper second edges are each between about four and six times larger than the radius of curvature of said upper corner edges.

4. The disposable cooking pan of claim 3, wherein the radius of curvature of said lower first edges is larger than the radius of curvature of said lower second edges, and wherein the radius of curvature of said upper first edges is larger than the radius of curvature of said upper second edges.

5. The disposable cooking pan of claim 1, wherein the radius of curvature of said upper first edges is larger than the radius of curvature of said lower first edges, and wherein the radius of curvature of said upper second edges is larger than the radius of curvature of said lower second edges.

6. The disposable cooking pan of claim 5, wherein said first pair of side walls define sections of curved surfaces of respective first imaginary cones having respective first imaginary points located below a level of said bottom panel, and wherein said second pair of side walls define sections of curved surfaces of respective second imaginary cones having respective second imaginary points located below the level of said bottom panel.

7. The disposable cooking pan of claim 1, wherein said bottom panel forms a centrally-located oval rib extending upwardly from a lowermost planar surface of said bottom panel.

8. The disposable cooking pan of claim 7, wherein said oval rib includes opposing sections defining respective curves generally parallel to said respective lower first edges of respective ones of said first pair of side walls.

9. The disposable cooking pan of claim 7, wherein said bottom panel further forms a pair of curved ribs extending upwardly from the lowermost planar surface of said bottom panel, said curved ribs being located on opposite sides of said oval rib.

10. The disposable cooking pan of claim 9, wherein said curved ribs define respective curves generally parallel to said respective lower first edges of respective ones of said first pair of side walls.

11. The disposable cooking pan of claim 10, wherein said oval rib includes opposing sections defining respective curves generally parallel to said respective lower first edges of respective ones of said first pair of side walls.

12. The disposable cooking pan of claim 1, wherein said continuous rim forms a first pair of rim portions connected to the upper edges of respective ones of said first pair of side walls, said first pair of rim portions having respective inner edges curved on said curvilinear upper first edges of respective ones of said first pair of side walls, said first pair of rim portions having respective straight outer edges.

13. A disposable cooking pan formed from a single sheet of metal, comprising:
a bottom panel;
a continuous wall panel encompassing said bottom panel and extending upwardly and outwardly from said bottom panel, said continuous wall panel forming a first pair of opposing side walls, a second pair of opposing side walls, and four corners bridging said first and second pairs of side walls, said first pair of side walls defining sections of curved surfaces of respective first imaginary cones having respective first imaginary points located below a level of said bottom panel, said second pair of side walls defining sections of curved surfaces of respective second imaginary cones having respective second imaginary points located below the level of said bottom panel, said four corners defining sections of curved surfaces of respective imaginary cylinders; and
a continuous rim encompassing an upper edge of said continuous wall panel and projecting laterally outwardly therefrom.

14. The disposable cooking pan of claim 13, wherein said bottom panel forms a centrally-located oval rib extending upwardly from a lowermost planar surface of said bottom panel, and wherein said bottom panel further forms a pair of curved ribs extending upwardly from the lowermost planar surface of said bottom panel, said curved ribs being located on opposite sides of said oval rib.

15. The disposable cooking pan of claim 14, wherein said oval rib includes opposing sections defining respective curves generally parallel to lower edges of respective ones of said first pair of side walls, and wherein said curved ribs define respective curves generally parallel to the lower edges of respective ones of said first pair of side walls.

16. A disposable cooking pan formed from a single sheet of metal, comprising:
a bottom panel;
a continuous wall panel encompassing said bottom panel and extending upwardly and outwardly from said bottom panel, said continuous wall panel forming a first pair of opposing side walls, a second pair of opposing side walls, and four corners bridging said first and second pairs of side walls, said first pair of side walls having respective upper edges curved laterally outwardly, said first pair of side walls being longer than said second pair of side walls; and
a continuous rim encompassing an upper edge of said continuous wall panel and projecting laterally outwardly therefrom, said continuous rim forming a first pair of rim portions connected to said upper edges of respective ones of said first pair of side walls, said first pair of rim portions having respective inner edges curved on said curved upper edges of respective ones of said first pair of side walls, said first pair of rim portions having respective straight outer edges.

17. The disposable cooking pan of claim 16, wherein said second pair of side walls have respective upper edges curved laterally outwardly, and wherein said continuous rim forms a second pair of rim portions connected to said upper edges of respective ones of said second pair of side walls, said second pair of rim portions having respective inner edges curved on said curved upper edges of respective ones of said second pair of side walls said second pair of rim portions having respective curvilinear outer edges generally parallel to said curved inner edges of respective ones of said second pair of rim portions.

18. The disposable cooking pan of claim 16, wherein said bottom panel forms a centrally-located oval rib extending upwardly from a lowermost planar surface of said bottom panel, and wherein said bottom panel further forms a pair of curved ribs extending upwardly from the lowermost planar surface of said bottom panel, said curved ribs being located on opposite sides of said oval rib.

19. The disposable cooking pan of claim 18, wherein said first pair of side walls have respective lower edges curved laterally outwardly, wherein said oval rib includes opposing sections defining respective curves generally parallel to said lower edges of respective ones of said first pair of side walls, and wherein said curved ribs define respective curves generally parallel to said lower edges of respective ones of said first pair of side walls.

20. A disposable cooking pan formed from a single sheet of metal, comprising:
a bottom panel;
a continuous wall panel encompassing said bottom panel and extending upwardly and outwardly from said bottom panel, said continuous wall panel forming a first pair of opposing side walls, a second pair of opposing side walls, and four corners bridging said first and second pairs of side walls, each of said first pair of side walls including curvilinear upper and lower first edges having respective radii of curvature, each of said second pair of side walls including curvilinear upper and lower second edges having respective radii of curvature, each of said four corners including curvilinear upper and lower corner edges having respective radii of curvature, said first pair of side walls, said second pair of side walls, or said four corners defining sections of curved surfaces of respective imaginary cylinders; and a continuous rim encompassing an upper edge of said continuous wall panel and projecting laterally outwardly therefrom.

21. The disposable cooking pan of claim 20, wherein said four corners define sections of curved surfaces of respective imaginary cylinders such that the radius of curvature of said upper corner edges is substantially equal to the radius of curvature of said lower corner edges.

* * * * *